June 22, 1954  J. C. BASSO  2,681,633
AUTOMOBILE PARKING DIAL
Filed May 28, 1951

Julius C. Basso
INVENTOR.

BY *Clarence A. O'Brien*
*and Harvey B. Jacobson*
Attorneys

Patented June 22, 1954

2,681,633

UNITED STATES PATENT OFFICE 2,681,633

AUTOMOBILE PARKING DIAL

Julius C. Basso, Owosso, Mich.

Application May 28, 1951, Serial No. 228,735

5 Claims. (Cl. 116—28)

The present invention relates to improvements in automobile accessories and more particularly to a dial which is adapted to be positioned on the shelf above the dash board of an automobile for aiding the driver in the parking of the vehicle.

An object of the present invention is to provide a device which is readily removably securable to the shelf above the dash board of a motor vehicle and includes an indicia bearing body with a pointer rotatable relative to the body, the pointer acting as an indicator for aiding the driver while parking the vehicle.

A further object of the present invention is to provide a device having a pointer adjustable in preselected angular relation to the body and the longitudinal axis of the vehicle to provide an indicating means adapted to aid the driver while parking a vehicle.

Various other objects and advantages will become apparent from a detailed description to follow. The best form in which I have contemplated applying my invention is clearly illustrated in the accompanying drawings, wherein.

Figure 1:
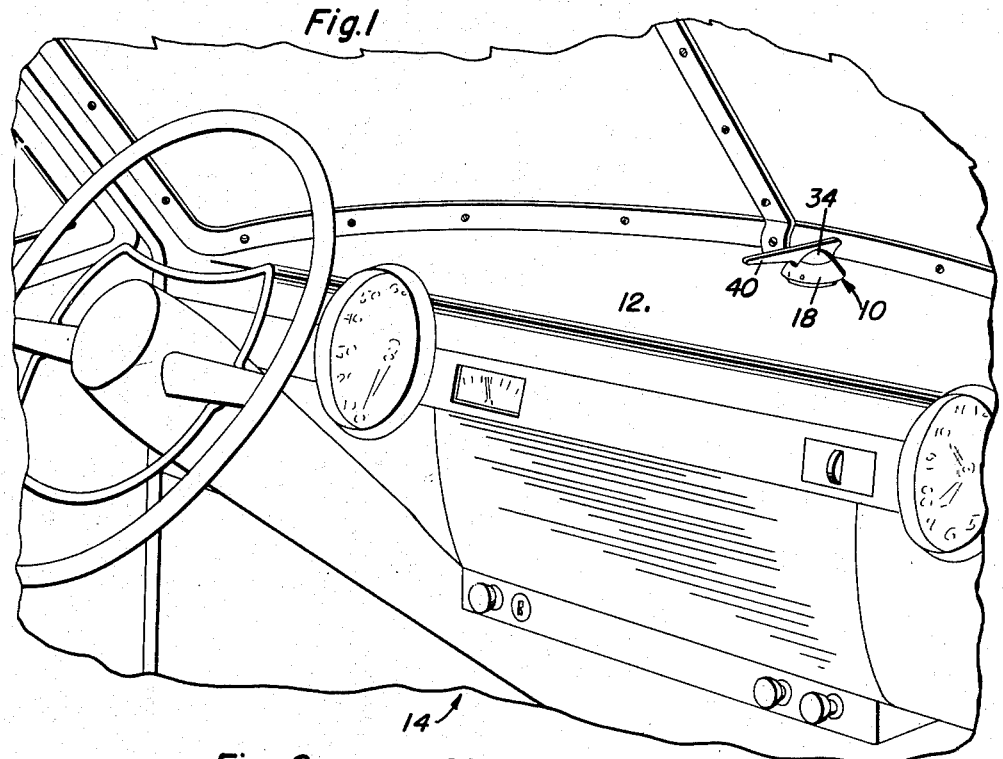
Figure 1 is a perspective view of the interior of an automobile showing the parking dial secured on the shelf above the dash board.
Figure 2:
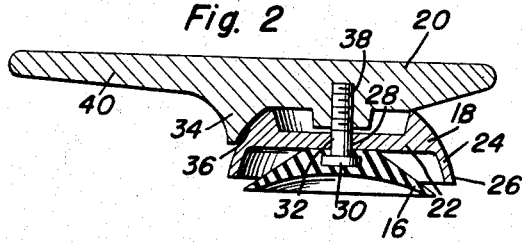
Figure 2 is a vertical longitudinal sectional view taken substantially along the plane of line 2—2 of Figure 4.
Figure 3:
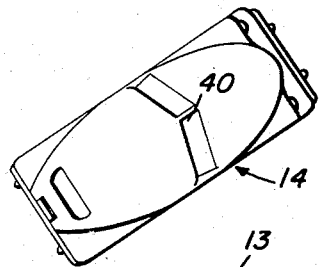
Figure 3 is a top plan view showing a pair of parked vehicles and a third vehicle being parked with the aid of the parking dial.
Figure 3:
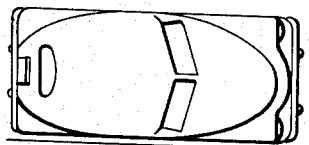
Figure 3:
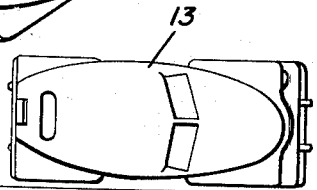
Figure 4:
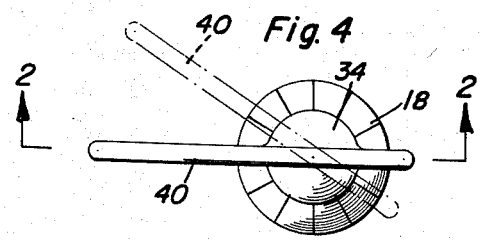
Figure 4 is a top plan view of the parking dial.

Referring more particularly to the drawings, wherein like numerals designate like parts throughout, the numeral 10 designates generally the parking dial of the present invention which is adapted to be secured to the shelf 12 above the dash board of a conventional automobile 14. As seen best in Figure 1, the parking dial 10 is secured to the shelf 12 and in juxtaposition to and to the right of the center of the dash board.

The parking dial 10 is comprised of a means 16 for attaching the device of the shelf 12, a body 18 and a pointer 20.

The body 18 includes a disk portion 22 to which is integrally formed the substantially spherical bearing portion 24 providing the bearing surface 26. The disk portion 22 has an axial opening 28.

Disposed on the underside of the disk portion 22 is a substantially conventional suction cup which is the means 16 hereinabove referred to. The suction cup 16 has the head 30 of a lug 32 embedded therein, the lug 32 extending axially from the suction cup 16 and through the opening 28 in the disk portion 22.

The pointer 20 has a main portion 34 formed with a substantially spherical recess 36 for slidable cooperation with the bearing surface 26 of the body 18. The main portion 34 is also formed with a threaded bore at 38 whereby the pointer 20 can be threadably secured to the lug 32. The main portion 34 is also provided with an elongated pointer 40.

The bearing surface 26 of the body 18 is formed with indicia markings such as degrees.

In view of the foregoing description of the structure of the parking dial of the present invention, it is believed that one will readily understand the manner in which the device is to be employed from the following description taken in conjunction with the drawings. When the parking dial has been secured to the shelf of the vehicle, at the position shown in Figure 1, the body 18 is held stationary while the pointer 40 is angularly displaced until it is aligned with approximately the 35 degree mark.

Thus, when the driver desires to park the vehicle, he merely drives up beside the vehicle 13, behind which he is to park, cuts his wheels sharply and backs up until the pointer 40 is in a position parallel to the roadway. The wheels are then turned sharply in the other direction as the vehicle is backed up. Inasmuch as automobiles vary in wheel lengths, it will undoubtedly be necessary for the driver to adjust the angular positioning of the pointer for the individual vehicle. In any event, the 35 degree mark will provide a fair initial adjustment for vehicles in general.

Having described the invention, what is claimed as new is:

1. An automobile parking dial comprising a body formed with preselected indicia markings thereon, an elongated pointer rotatably and adjustably carried by said body, said body having an outer peripheral portion thereof providing a substantially spherical bearing surface, a central portion of said body having a bore therethrough, said pointer having a portion thereof formed with a bearing surface for cooperation with said spherical bearing surface, and a bearing lug threadably engaged in said pointer and rotatably disposed through the bore of the body, and means for securing the dial on a shelf above a dash board of an automobile.

2. An automobile parking dial comprising a body formed with preselected indicia markings thereon, an elongated pointer rotatably and adjustably carried by said body, said body having an outer peripheral portion thereof providing a substantially spherical bearing surface, a central portion of said body having a bore therethrough, said pointer having a portion thereof formed with a bearing surface for cooperation with said spherical bearing surface, and a bearing lug threadably engaged in said pointer and rotatably disposed through the bore of the body, and means for securing the dial on a shelf above the dash board, said last-named means including a suction cup, said lug being formed with an enlarged head rotatably embedded in said suction cup.

3. An attachment adapted to be mounted on a shelf above a dash of a vehicle, said attachment including a supporting body adapted to be fixedly engaged on said shelf, an elongated pointer rotatably carried by said supporting body, indicia on said supporting body for aligning said pointer, said pointer being rotated to be positioned at an angle to the longitudinal axis of a vehicle for aiding the operator of same in parking.

4. An automobile parking dial comprising a body formed with preselected indicia markings thereon, a pointer carried by said body in rotationally adjusted relation, said pointer having an elongated flat configuration and lying in a plane normal to said body, fastening means securing said pointer to said body, said fastening means securing said body to mounting means for the same.

5. In combination with an automobile having a dash board and a shelf above said dash board, a parking dial, said parking dial including a supporting body removably secured to said shelf, an elongated pointer rotatably carried by said supporting body, indicia on said supporting body for aligning said pointer, said pointer being positionable to the longitudinal axis of said automobile for aiding in the parking of said automobile.

References Cited in the file of this patent

UNITED STATES PATENTS

| Number | Name | Date |
|---|---|---|
| 1,097,295 | Brown et al. | May 19, 1914 |
| 1,449,705 | St. Clair | Mar. 27, 1923 |
| 1,546,992 | Oppman | July 21, 1925 |
| 1,731,749 | Miller | Oct. 15, 1929 |
| 2,214,161 | Cater | Sept. 10, 1940 |

FOREIGN PATENTS

| Number | Country | Date |
|---|---|---|
| 75,604 | Switzerland | Oct. 1, 1917 |
| 645,444 | France | June 27, 1928 |
| 295,121 | Great Britain | Aug. 9, 1928 |